United States Patent [19]

Nakamura et al.

[11] Patent Number: 4,879,796

[45] Date of Patent: Nov. 14, 1989

[54] VALVE INSERTING APPARATUS FOR AN INTERNAL COMBUSTION ENGINE

[75] Inventors: Katsumi Nakamura; Shigeyuki Koide; Norio Honda; Kazufumi Tamura, all of Suzuka; Akifumi Kobayashi, Yokkaichi, all of Japan

[73] Assignees: Honda Giken Kogyo Kabushiki Kaisha, Tokyo; Dainichi Kogyo Kabushiki Kaisha, Yokkaichi, both of Japan

[21] Appl. No.: 146,948

[22] Filed: Jan. 22, 1988

[51] Int. Cl.[4] .............................................. B23P 19/04
[52] U.S. Cl. ....................................... 29/214; 29/281.4
[58] Field of Search ....................... 29/214, 271, 281.4, 29/281.5

[56] References Cited

U.S. PATENT DOCUMENTS 2,286,695  6/1942  Taylor ................................... 29/214
4,675,969  6/1987  Sciaky et al. ...................... 29/281.4

FOREIGN PATENT DOCUMENTS 52-27866  7/1977  Japan .
0224224  12/1984  Japan .................................... 29/271
0903065  2/1982  U.S.S.R. ............................. 29/281.5

Primary Examiner—Judy Hartman
Attorney, Agent, or Firm—Armstrong, Nikaido, Marmelstein, Kubovcik & Murray

[57] ABSTRACT

A valve inserting apparatus for an internal combustion engine has a cylinder head of the engine supported by a jig such that its surface on a combustion chamber side is positioned facing upward and the longitudinal axis of a valve guide assembled to the cylinder head is kept vertical while a valve is inserted into the valve guide from above. The valve inserting apparatus includes a valve inserting unit for moving upwards and downwards. A valve holding device detachably, swingably, holds the valve with its head portion facing upward. A valve push-in device is provided and a suction device moves into contact with a lower end of the valve guide. The push-in device comprises an upwardly and downwardly movable push rod having a weight attached to the upper end portion. The push rod abuts the head portion of the valve from above. The valve inserting unit includes a first detector for detecting whether or not the push rod is at a position higher than a first predetermined reference position, such that the position of the push rod when the push rod in abutment with the valve and the valve inserting unit has been lowered to a predetermined position where the lower end of the valve has been inserted into an upper end of the valve guide to a predetermined depth. The valve inserting device further includes a second detector for detecting whether or not the push rod is at a position lower than a second predetermined reference position, that is, the position of the push rod when the lower end of the valve reaches the stem seal.

7 Claims, 9 Drawing Sheets

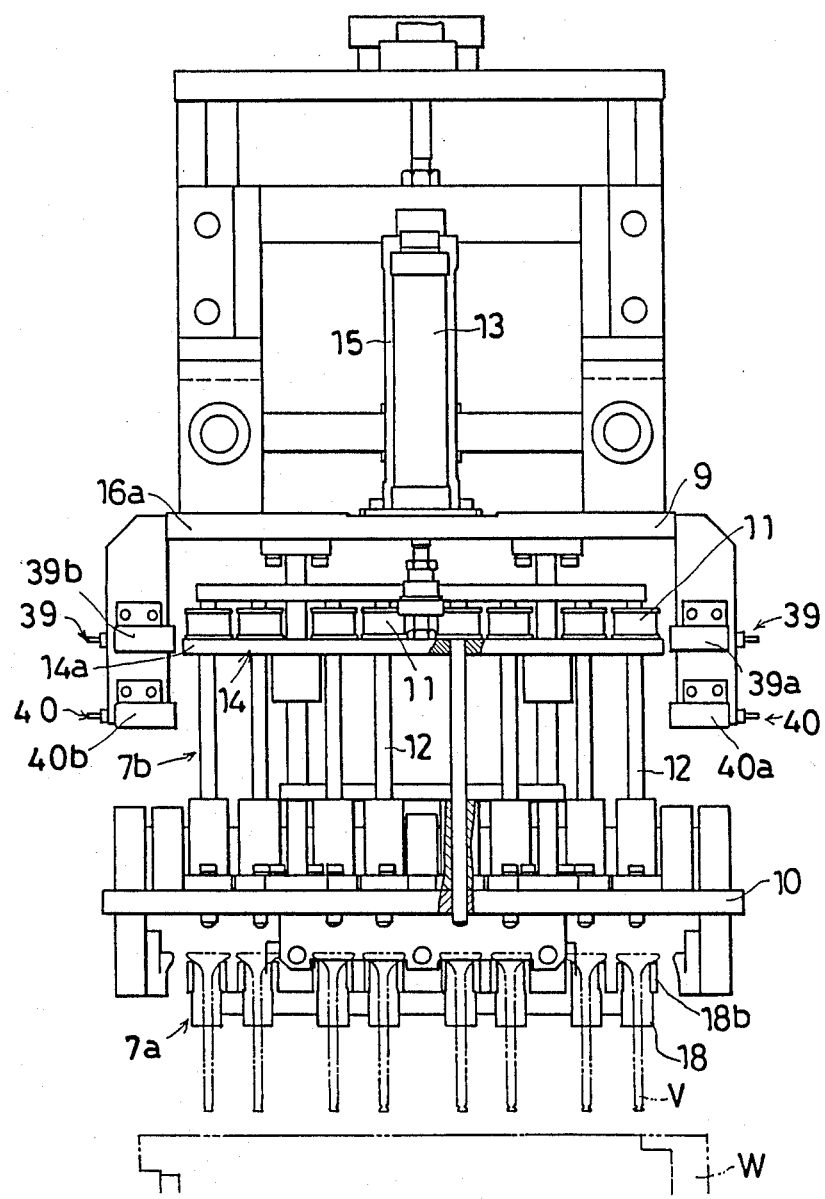

FIG.16
FIG.17
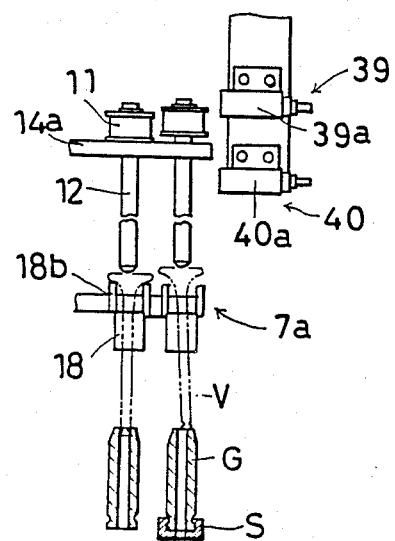
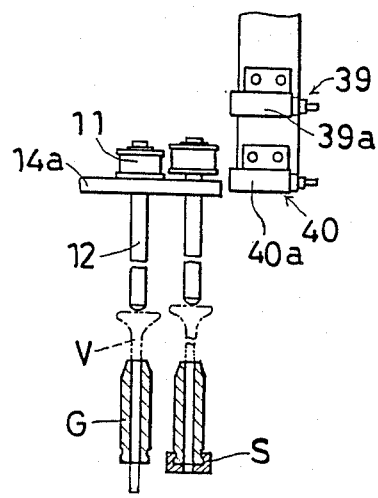

VALVE INSERTING APPARATUS FOR AN INTERNAL COMBUSTION ENGINE

BACKGROUND OF THE INVENTION

1. Field of the Invention

This invention relates to a valve inserting apparatus for inserting a valve into a valve guide assembled into a cylinder head of an internal combustion engine.

2. Description of the Prior Art

In a prior art apparatus disclosed in Japanese Patent Application Publication No. Sho 52-27866 a jig means supports a cylinder head in such a manner that its surface on a combustion chamber side is positioned facing up and a longitudinal axis of a valve guide is in a vertical position. A valve inserting unit, which can be driven to move up and down, is provided. The valve inserting unit includes a valve holding member which holds a valve with its head portion facing up and which allows the valve to be detachable and slightly swingable, and a push rod for abutting a head portion of the valve. A suction means moves in and out of contact with a lower end of the valve guide, such that when the suction means is brought into contact with the lower end of the valve guide, the inserting unit is lowered to a predetermined position and the lower end of the valve held by the holding member is drawn into and inserted into the upper end of the valve guide by a suction force of the suction means. The suction means is then separated from the valve guide and the holding means releases the valve so the valve can be pushed into the valve guide by the push rod. The push rod is arranged to be movable upwards and downwards by a pushing cylinder connected thereto.

With this conventional type apparatus, when the lower end of the valve is interfered with by the upper end surface of the valve guide and is not drawn into the valve guide, the valve is pushed against the valve guide by the pushing of the valve by the pushing cylinder. Thus, there can often be damage to the upper end opening thereof.

SUMMARY OF THE INVENTION

It is the object of the present invention to provide a valve inserting apparatus for inserting a valve into a valve guide assembled into a cylinder head of an internal combustion engine.

It is another object of the present invention to provide a valve inserting apparatus which includes a first detecting device for detecting if the valve stem, because of misalignment, contacts the top of the valve guide such that the insertion of the valve is inhibited.

It is still another object of the present invention to provide a valve inserting apparatus which includes a second detecting device for detecting if the valve stem passes through the bottom of the valve guide as a result of the lack of a stem seal thereon.

The present invention is directed to a valve inserting apparatus for an internal combustion engine wherein a cylinder head of the engine is supported by a jig such that its surface on a combustion chamber side is positioned facing upward and the longitudinal axis of a valve guide assembled to the cylinder head is kept vertical while a valve is inserted into the valve guide from thereabove. The valve inserting apparatus comprising a valve inserting device for moving upwards and downwards; a valve holding device for detachably, swingably, holding the valve with its head portion facing upward; a valve push-in device; and a suction device for moving into contact with a lower end of the valve guide. The push-in device comprises an upwardly and downwardly movable push rod having a weight attached to the upper end portion thereof, the push rod abutting the head portion of the valve from above. The valve inserting device includes a first detecting device for detecting whether or not the push rod is at a position higher than a first predetermined reference position, such that the position of the push rod when the push rod in abutment with the valve and the valve inserting device has been lowered to a predetermined position where the lower end of the valve has been inserted into an upper end of the valve guide to a predetermined depth. The valve inserting device further includes a second detecting device for detecting whether or not the push rod is at a position lower than a second predetermined reference position that is the position of the push rod when the lower end of the valve reaches the stem seal.

BRIEF DESCRIPTION OF THE DRAWINGS

FIG. 4 a front view of the valve inserting unit viewed from the right in FIG. 3.

FIG. 16 is a diagram for explaining the operation of a first detecting the present invention.

FIG. 17 is a diagram explaining the operation of a second detecting means of the present invention.

DETAILED DESCRIPTION OF THE PREFERRED EMBODIMENT

Figure 1:
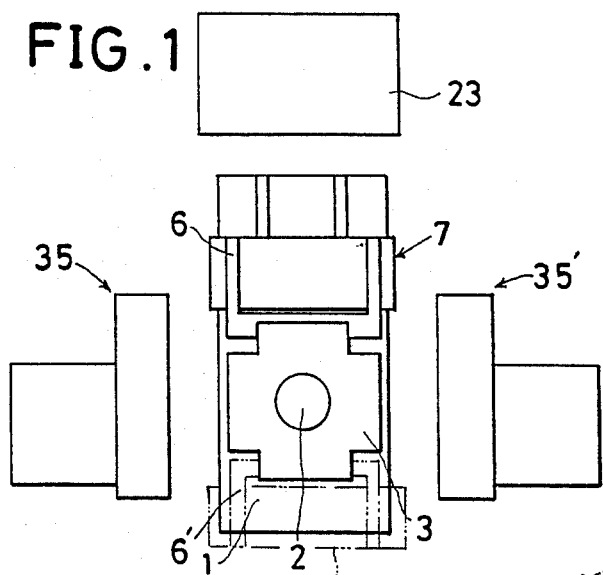
FIG. 1 a plan view of the entire apparatus of the present invention.
Figure 2:
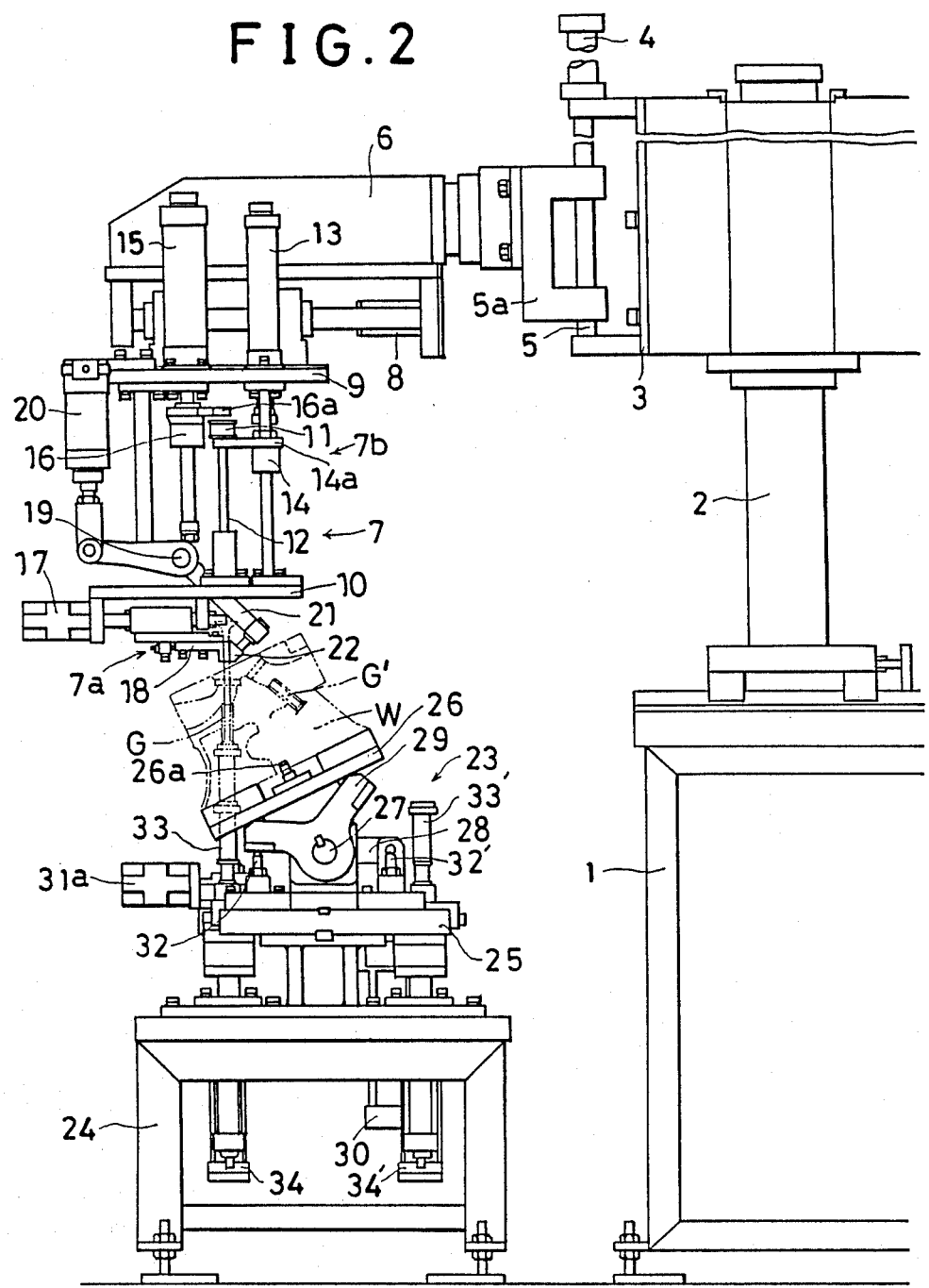
FIG. 2 is a side view of a valve inserting unit moved to position above the jig means of the present invention.

Referring to FIGS. 1 and 2, a supporting column 2 is vertically provided on a machine base 1 so as to be movable forward and rearward by a driving source (not illustrated). A swingable frame 3 is supported on an outer circumference of an upper portion of the supporting column 2 so as to be swingable by a driving source (not illustrated), and a supporting arm 6 which is movable upwards and downwards along a guide bar 5 by a cylinder 4 is attached to the swingable frame 3. The supporting arm 6 is provided with a valve inserting unit 7 extending downward therefrom.

The valve inserting unit 7 has a pair of upper and lower parallel supporting plates 9 and 10 arranged to be horizontally movable along the supporting arm 6 by a cylinder 8. The valve inserting unit 7 includes a valve holding means 7a and a valve push-in means 7b.

Figure 3:
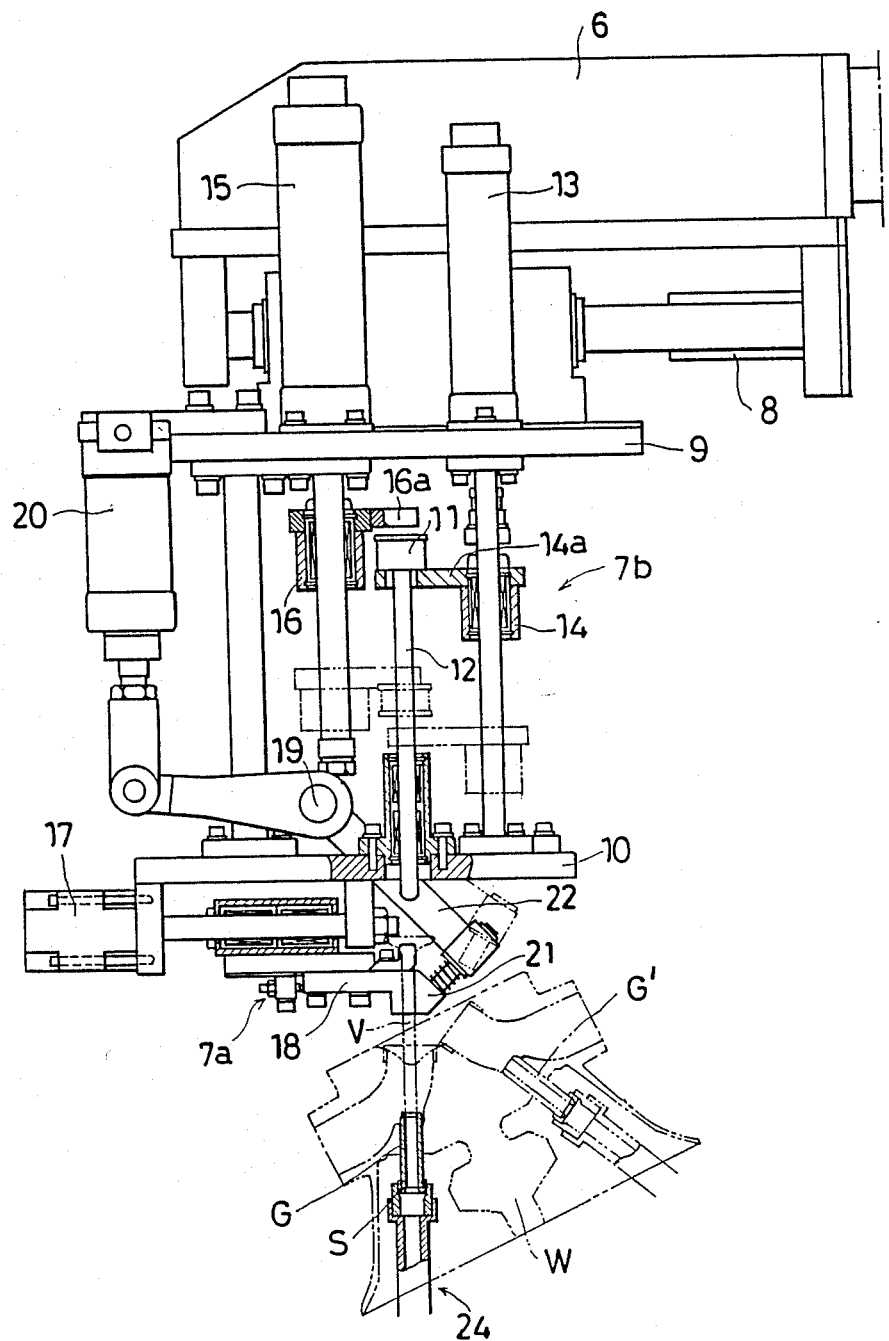
FIG. 3 is an enlarged side view of the valve inserting unit of the present invention.

As shown clearly in FIG. 3, the valve push-in means 7b comprises a push rod 12 which is inserted through the lower supporting plate 10 and is movable upwards and downwards. A weight 11 is provided at the upper end of push rod 12. A push rod supporting member 14, which is movable upwards and downwards by a cylinder 13, is fixed to the upper supporting plate 9 and serves to support, at a horizontally extending portion 14a, a lower portion of the weight 11 of the push rod 12. A push rod pushing member 16, which is movable upwards and downwards by a cylinder 15, is fixed to the upper supporting plate 9 and uses its horizontally extending portion 16a to push the upper end portion of the push rod 12.

The push down force of the push rod 12 caused by its own weight including the weight 11, is set to be less than the force needed for causing the lower end of a valve V to thrust through a stem seal S attached to a lower end of a valve guide G. Thus, the lower end of the valve V passes through the stem seal S as a result of the pushing force of the push rod 12 and the weight 11 plus the pushing force of the pushing member 16.

Figure 11:
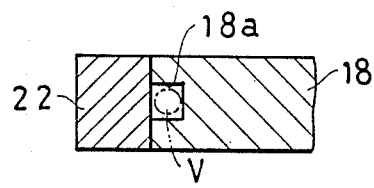
FIG. 11 is a sectional view taken along the line A—A in FIG. 9.
Figure 12:
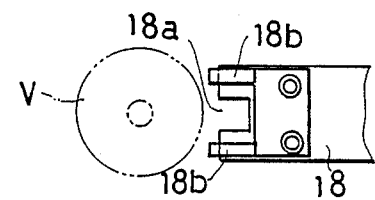
FIG. 12 is a top view of the valve holding means of the present invention.

The holding means 7a comprises a guide member 18 which is moved by a cylinder 17 in the horizontal direction in relation to the supporting plate 10. The guide member 18 is provided at its end surface with a guide groove 18a which is slightly larger than the diameter of the shaft portion of the valve V, as shown in FIGS. 11 and 12. A closure member 22 is fixed to an end portion of a lever 21 and is rotatable about a supporting shaft 19 by the operation of a cylinder 20. The closure member 22 opens and closes the guide groove 18a of the guide member 18. Valve head supporting members 18b for supporting the head portion of the valve V at two points on the circumference of a tapered surface thereof, project from an upper surface of the guide member 18, so that the valve V can be swung with respect to the supporting members 18b to the extent of the free space within the guide groove 18a.

The above described embodiment is a valve inserting apparatus for a multi-cylinder engine, in which there are plural pairs of guide members 18 and closure members 22 forming the valve holding means 7a, and a plurality of the push rods 12 forming the valve push-in means 7b.

Figure 5:
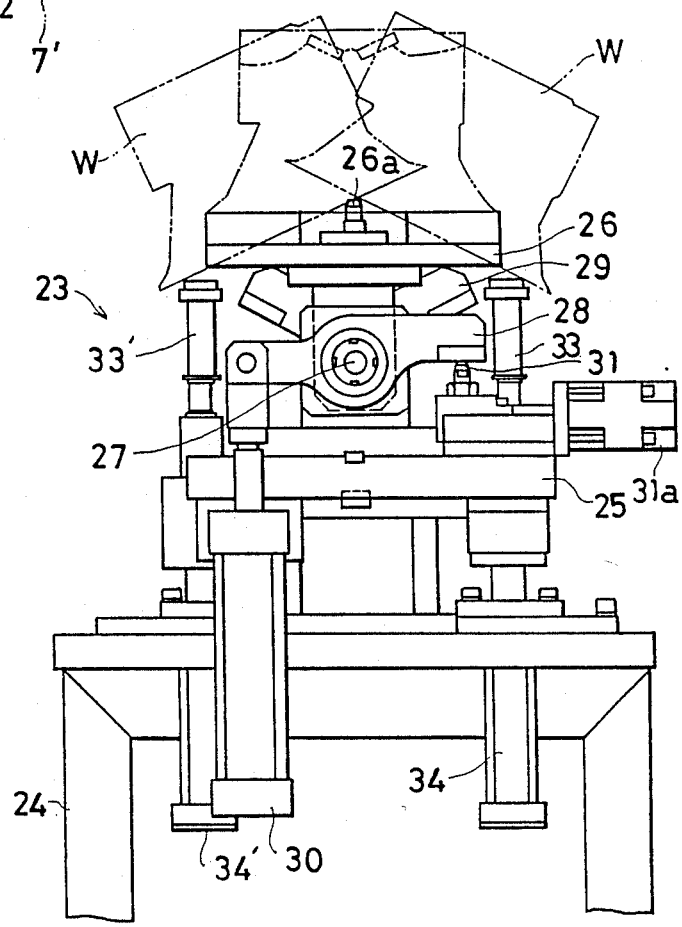
FIG. 5 is an enlarged side view of the jig means viewed from a side opposite to that in FIG. 2.

A jig means 23 is located in front of the machine base 1. The jig means 23, as shown clearly in FIGS. 2 and 5, comprises a jig plate 26 for supporting a cylinder head W, with its surface on a combustion chamber side facing upward. The jig plate 26 is pivotally supported on a jig base 25 mounted on a supporting base 24 such that the jig plate 26 is swingable about horizontal shaft 27.

A lever 28 and a nearly V-shaped stopper member 29 are fixed to an end portion of the horizontal shaft 27, and a cylinder 30 on the supporting base 24, is connected to one end of the lever 28 such that the jig plate 26 may be swung by the cylinder 30. A stopper pin 31, which is arranged to abut the other end of the lever 28 for positioning the jig plate 26 in its horizontal position, is provided on the jig base 25 and is retractable by a cylinder 31a to a withdrawn position for allowing a swing movement of the jig plate 26. Additionally, a pair of stopper pins 32 and 32' are mounted on jig base 25 to abut the corresponding ends of the stopper member 29 for regulating the swinging movement of the jig plate 26. Thus, at the position where the swing movement in one direction thereof is regulated by the stopper pin 32 on one side, the longitudinal axis of the valve guide G on the intake side of the cylinder head W is vertical, and at the position where the swing movement in the other direction thereof is regulated by the stopper 32' on the other side, the longitudinal axis of the valve guide G' on the exhaust side is vertical. A positioning pin 26a for the cylinder head W is provided on the jig plate 26.

A pair of tubular suction means 33 and 33' connected to a negative pressure source (not illustrated), are positioned on the supporting base 24 coaxial with the longitudinal axes of the respective valve guides G and G, when the jig plate 26 is in its respective swung position in one direction or the other, so that, by moving the respective suction means 33 and 33' upwards and downwards by the respective cylinders 34 and 34', the suction means are brought into contact with and separated from the lower ends of the respective valve guides G and G'.

Figure 6:
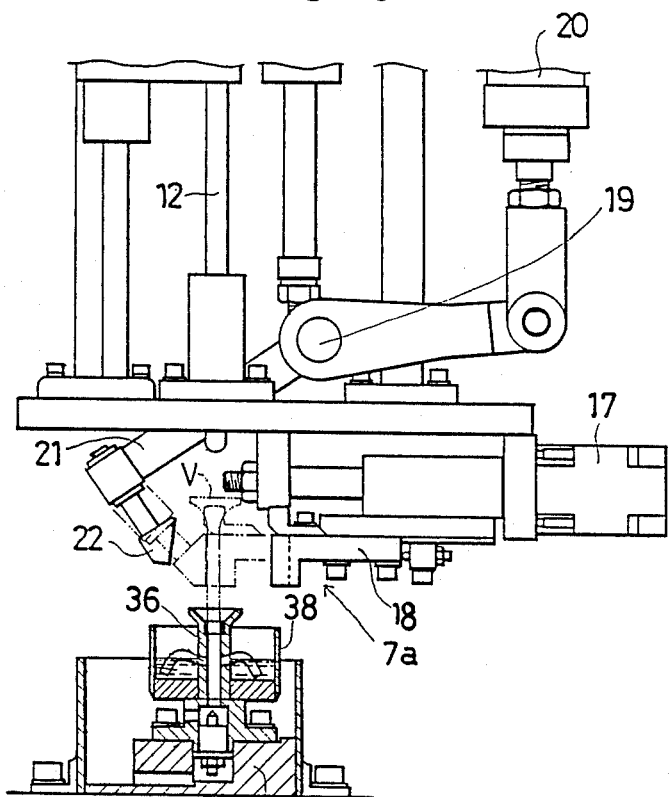
FIG. 6 is a side view showing the relation between the jig means and valve supply means of the present invention.
Figure 7:
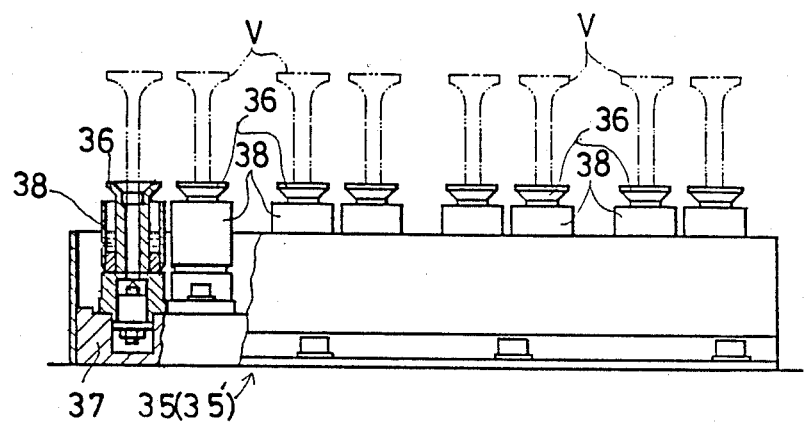
FIG. 7 is a front view, partly in section, of the valve supply means of the present invention.

Valve supply means 35 and 35' for intake valves and exhaust valves are disposed on both sides of the machine base 1, and each of the supply means 35 and 35' comprises, as shown in FIGS. 6 and 7, plural holding tubes 36 mounted on supporting base 37 for detachably holding the valve V with its head portion facing up. Oil containing tanks 38 on the supporting base 37 surround the respective holding tubes 36, whereby oil is applied to the shaft or stem of each valve V.

Besides the valve holding means 7a and the valve pushin means 7b, the valve inserting unit 7 is provided with a first detecting means 39 and a second detecting means 40. The first detecting means 39 detects whether or not the push rod 12 is at a position above a first reference position, that is, a lowered position of the push rod 12 (the position of the push rod on the left side in FIG. 16) when the push rod 12 is brought into contact with the valve V and the unit 7 has been lowered to a predetermined position where the lower end of the valve V is inserted into the upper end of the valve guides G or G, to a predetermined depth. The second detecting means 40 detects whether or not the push rod 12 is at a position lower than a second reference position, that is, a lowered position of the push rod 12 (the position of the push rod on the right side in FIG. 17) when the lower end of the valve V reaches the stem S on the lower end of the valve guide G or G'.

The respective detecting means 39 and 40 comprise light projecting means 39a and 40a and light receiving means 39b and 40b which are positioned on opposite sides of the push rods 12 facing each other. The light projecting and receiving means 39a and 39b of the first detecting means 39 are positioned at a height such that when the push rod 12 is at a position higher than the first reference position, the light from the light projecting means 39a is obstructed by an upper end of the push rod 12. The light projecting and receiving means 40a and 40b of the second detecting means 40 are positioned at a height such that when the push rod 12 is at a position lower than the second reference position, the light from the light projecting means 40a is obstructed by the weight 11 of the push rod 12.

Figure 8:
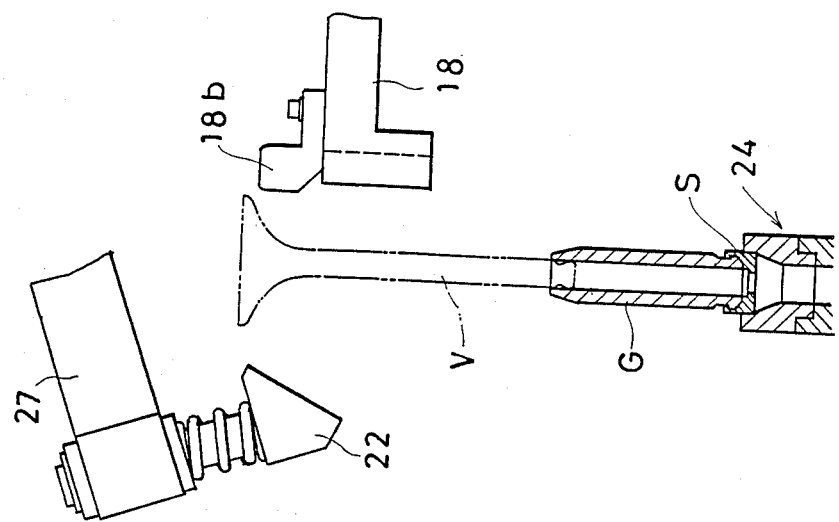
FIGS. 8–10 are views for explaining the operation of valve holding means of the present invention.

The operation of the foregoing embodiment will be explained as follows:

First, the swing movement of the swingable frame 2 moves the valve inserting unit 7 from the condition shown in FIG. 1, to a position above the intake valve supply means 35, where it is lowered by the cylinder 4. Then, by operation of the cylinder 17 and the cylinder 20 of the valve holding means 7a, the guide member 18 and the closure member 22 which were previously opened, are closed, whereby the intake valve V held by each of the holding tubes 36 of the supply means 35 is held by unit 7. The unit 7 is then raised and is moved to a position above the jig means 23 by the swing movement of the swingable frame 3 and the movement of the supporting column 2. When this occurs, the jig plate 26 has already been swung from its horizontal position to its swung position on one side where one end of the stopper member 29 comes in contact with the stopper pin 32. The suction means 33 is elevated so that, as shown in FIG. 8, the suction means 33 is in contact with the stem seal S at the lower end of the valve guide G on the intake side, thus enabling a suction operation of the suction means 33 by the negative pressure source which is started at the same time as the downward movement of the unit 7 by the cylinder 4.

Figure 9:
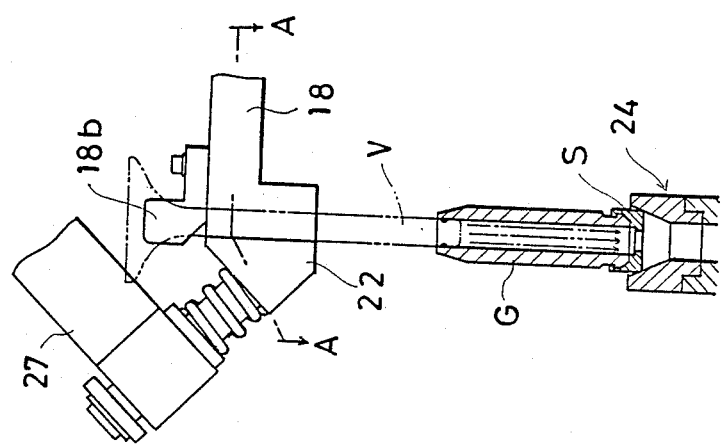
Figure 10:
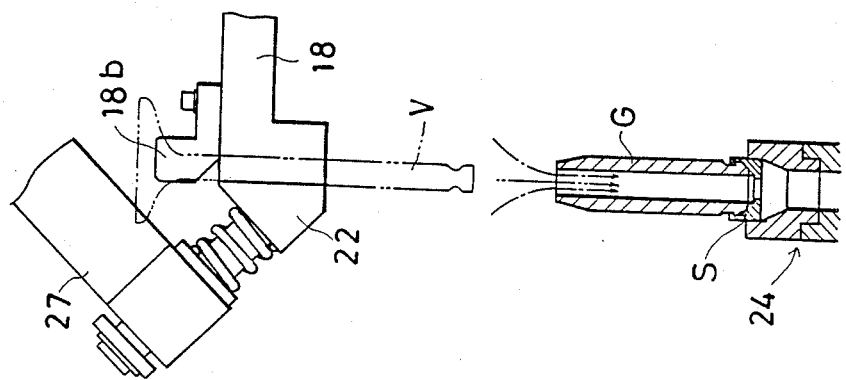
Figure 13:
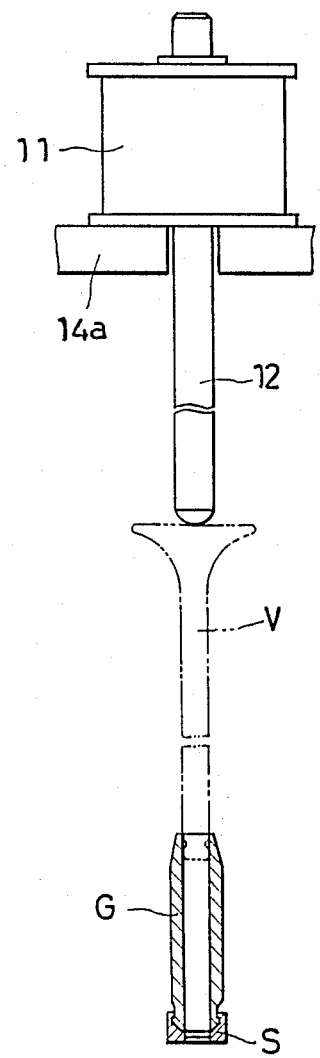
FIGS. 13–15 are diagrams for explaining the operation of the valve push-in means of the present invention.
Figure 14:
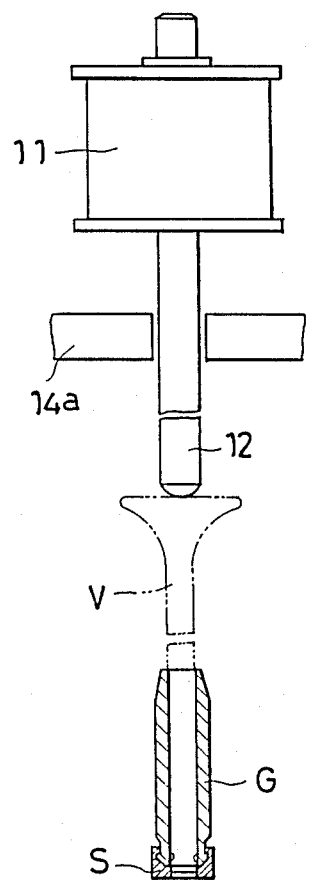
Figure 15:
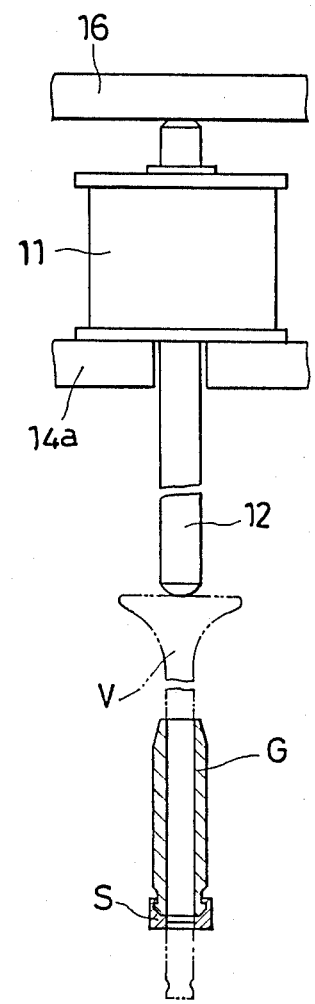

Thus, the intake valve V which is swingably held by the valve holding means 7a is compensated for misalignment in its centering displacement by the suction operation of the suction means 33, and, as shown in FIG. 9, the lower end thereof is drawn into an upper end opening of the valve guide G and the valve inserting unit 7 is stopped after being lowered to a predetermined position. Thereafter, the push rod supporting member 14 is lowered by the cylinder 13 to a position where the push rod 12 abuts the head portion of the intake valve V, as shown in FIG. 13. In this condition, the detecting operation of the first detecting means 39 is carried out.

If at this stage, there is a misoperation in suction into the guide G because the lower end of the valve V contacts the upper end of the valve guide G as in the case of the intake valve V shown on the right side in FIG. 16, the push rod 12 abutting thereon is stopped from moving further downwards at a position higher than the first reference position. The light from the light projecting means 39a of the first detecting means 39 is thus, obstructed by the upper end of the push rod 12 and is not received by the light receiving means 39b. In such a case, the valve inserting unit 7 is raised and then lowered again for reinsertion of the valve V.

When all the intake valves V are drawn into the valve guide G, all the push rods 12 are lowered to the first reference positions thereof, and a light receiving signal is thus generated from the light receiving means 39b, the holding of the valve by the valve holding means 7a is released, the suction means 33 is lowered, and the push rod supporting member 14 is lowered to a predetermined lower end position.

With the operation described above, the push rod 12 is caused to move downward by its own weight, pushing the intake valve V into the valve guide G, and when the lower end of the intake valve V reaches the stem seal S, the resilient force of the stem seal acts to stop the intake valve V from moving down any further. In this condition, the detecting operation by the second detecting means 40 is carried out.

If, the stem seal S does not exist at the lower end as in the case of the guide valve G shown on the left side in FIG. 17, the lower end of the intake valve V moves downwards and projects through the guide G. The push rod 12 which is in abutment thereon is lowered to a position lower than the second reference position, and the light from the light projecting means 40a of the second detecting means 40 is obstructed by the weight 11 of the push rod 12 so as not to be received by the light receiving means 40b. In this case, the valve inserting unit 7 is elevated, and the fact that the stem seal S does not exist is indicated to an operator by a warning means (not illustrated) such as a buzzer or the like.

When all of the valve guides G are provided with the stem seals S attached thereto, all the push rods 12 are stopped at the second reference position, and a light receiving signal is generated from the light receiving means 40b. The push rod pushing member 16 is then lowered by the cylinder 15 to forcibly push down the push rod 12. With the operations above, the lower end of the intake valve V is lowered to project through the stem seal S while spreading it out, and the intake valve V is thus, inserted completely into the valve guide G.

Next, the push rod 12 is returned to the original position by raising the pushing member 16 and the supporting member 14. The unit 7 is then elevated. By a retracting movement of the supporting column 2 and a swing movement of the swingable frame 3, the unit 7 is moved to a position above the valve supply means 35' for the exhaust valves, and at this position, the unit 7 is lowered and the exhaust valve is held by the holding means 7a. Thereafter, the unit 7 is returned to the position above the jig means 23, and during this time, the jig plate 26 is swung to a swung position thereof on the side in abutment on the stopper pin 32'. Thus, the longitudinal axis of the valve guide G' on the exhaust side is made vertical, and the insertion of the exhaust valve G' is carried out in almost the same manner as described above.

Thus, according to the present invention, when there is a suction error in drawing the valve into the valve guide, it is possible to repeat the valve inserting operation through detection of the suction error without pushing the valve into the valve guide. Thus, the valve can be inserted properly without applying an unreasonable force.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A valve inserting apparatus for an internal combustion engine, a cylinder head of the engine being supported by a jig means such that a surface of said cylinder head on a combustion chamber side is positioned facing upward, such that a longitudinal axis of a valve guide which is assembled to the cylinder head is kept vertical while a valve is inserted into the valve guide from thereabove by said valve inserting apparatus, said valve inserting apparatus comprising:

a valve inserting means, located above said cylinder head for movement relative to the cylinder head, said valve inserting means including a valve holding means for detachably, swingably, holding the valve with a head portion of said valve facing upward and said valve inserting means further including a valve push means for pushing in said valve into said valve guide; and a suction means for moving into contact with a lower end of the valve guide of the cylinder head to apply suction thereto, while said valve is being located therein said suction means being supported on said jig means and being located beneath said cylinder head and coaxial with the longitudinal axis of the valve guide, wherein said valve push-in means comprises an upwardly and downwardly movable push rod having a weight attached to an upper end portion of said push rod, and wherein said valve inserting means includes a first detecting means for detecting whether or not the push rod is at a first predetermined reference position, said first predetermined reference position being a position of said push rod when the push rod is in abutment with the valve and whereby when said push rod is in said first predetermined reference position said valve inserting means is lowered to where a lower end of the valve has been inserted into an upper end of the valve guide to a predetermined depth.

2. A valve inserting apparatus as claimed in claim 1, wherein the first detecting means comprises a light projecting means and a light receiving means, said light projecting means and said light receiving means being positioned on opposite sides of said push rod, facing each other, such that when said push rod is above said first predetermined reference position, a light from the light projecting means is obstructed by the upper end of said push rod.

3. A valve inserting apparatus as claimed in claim 1, wherein a push-down force of said push rod, resulting from the weight attached to said push rod, is smaller than a force needed for pushing the lower end of the valve through a stem seal attached to the lower end of the valve guide, and wherein said valve inserting means has a second detecting means for detecting whether or not said push rod is at a second predetermined reference position which is a position of the push rod when the lower end of the halve reaches other stem seal.

4. A valve inserting apparatus as claimed in claim 3, wherein said second detecting means comprises a light projecting means and a light receiving means, said light projecting means and light receiving means being positioned on opposite sides of said push rod, facing each other, such that, when said push rod is below said second predetermined reference position, a light from the light projecting means is obstructed by said weight attached to said push rod.

5. A valve inserting apparatus as claimed in claim 3, wherein said valve push-in means includes a push rod pushing member, abutting the upper end of said push rod, for forcibly pushing said push rod downwards.

6. A valve inserting apparatus as claimed in any one of claims 1, 3 or 5, wherein said valve push-in means includes a raisable push rod supporting member for supporting a lower surface of said weight of said push rod.

7. A valve inserting apparatus as claimed in any one of claims 1, 3, or 5, wherein said valve holding means comprises a guide member having a guide groove at a forward end thereof to receive a shaft portion of the valve with a gap remaining around said shaft portion and a pair of valve head supporting members at an upper surface of the forward end portion of the guide member, for supporting the head portion of the valve at two points on the shaft portion of said valve, and a closure means for abutting the forward end of said guide member for closing said guide groove.

* * * * *